US008314384B2

(12) United States Patent
Stoermer et al.

(10) Patent No.: US 8,314,384 B2

(45) Date of Patent: Nov. 20, 2012

(54) MIXED RADIO FREQUENCY MULTIPOLE ROD SYSTEM AS ION REACTOR

(75) Inventors: Carsten Stoermer, Bremen (DE); Karsten Michelmann, Bremen (DE); Michael Schubert, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 13/112,593

(22) Filed: May 20, 2011

(65) Prior Publication Data

US 2011/0284741 A1 Nov. 24, 2011

(30) Foreign Application Priority Data

May 21, 2010 (DE) ........................ 10 2010 022 184

(51) Int. Cl.
*H01J 49/42* (2006.01)
*B01D 59/44* (2006.01)

(52) U.S. Cl. ........ 250/290; 250/292; 250/293; 250/281; 250/282

(58) Field of Classification Search .................. 250/281, 250/282, 292, 283, 290, 288
See application file for complete search history.

(56) References Cited

U.S. PATENT DOCUMENTS 5,572,035 A 11/1996 Franzen
6,707,037 B2 * 3/2004 Whitehouse .................. 250/288
7,026,613 B2 4/2006 Syka
7,227,130 B2 6/2007 Hager et al.
7,288,761 B2 10/2007 Collings
7,456,397 B2 11/2008 Hartmer
7,557,344 B2 7/2009 Chernushevich et al.
7,872,229 B2 * 1/2011 Park et al. ..................... 250/292
2002/0175278 A1 * 11/2002 Whitehouse .................. 250/281
2004/0238734 A1 * 12/2004 Hager et al. .................. 250/281
2005/0199804 A1 9/2005 Hunt et al.
2007/0158545 A1 * 7/2007 Verentchikov ................ 250/282
2009/0014645 A1 * 1/2009 Chernushevich et al. .... 250/292
2009/0032700 A1 * 2/2009 Park et al. ..................... 250/282
2009/0283675 A1 11/2009 Franzen
2010/0032561 A1 2/2010 Giles
2010/0108880 A1 * 5/2010 Stoermer ...................... 250/283
2011/0139976 A1 * 6/2011 Park et al. ..................... 250/282

OTHER PUBLICATIONS

Huang et al., "Electron-Transfer Reagent Anion Formation via Electrospray Ionization and Collision-Induced Dissociation", Anal. Chem. 2006, 78, 7387-7391.

Xia et al., "Evolution of Instrumentation for the Study of Gas-Phase Ion/Ion Chemistry via Mass Spectrometry", J. Am Soc Mass Spectrom 2008, 19, 173-189.

* cited by examiner

*Primary Examiner* — Nikita Wells
*Assistant Examiner* — Johnnie L Smith
(74) *Attorney, Agent, or Firm* — O'Shea Getz P.C.

(57) ABSTRACT

The invention relates to a linear multipole ion storage device which is suitable for reactions between positive and negative ions, and for fragmentation reactions by electron transfer dissociation (ETD) in particular. The invention uses a linear RF ion trap with at least three pairs of rods with a new type of electronic power supply. The two phases of a first RF voltage are applied to the pole rods alternately around the circumference and confine positive as well as negative ions in the radial direction. A second RF voltage is either applied single-phase to some of the pole rods, but not to all of them, or two-phase to unequal numbers of pole rods so that the axis potential oscillates with the frequency of this second RF voltage and generates a pseudopotential barrier which acts axially on ions of both polarities at the ends of the ion storage device. In the interior, the second RF produces a complex superposition field resulting in an increased fragmentation yield for ETD.

12 Claims, 3 Drawing Sheets

MIXED RADIO FREQUENCY MULTIPOLE ROD SYSTEM AS ION REACTOR

PRIORITY INFORMATION

This patent application claims priority from German Patent Application 10 2010 022 184.8 filed on May 21, 2010, which is hereby incorporated by reference.

FIELD OF THE INVENTION

The invention relates to a linear multipole ion storage device which is suitable for reactions between positive and negative ions, and for fragmentation reactions by electron transfer dissociation (ETD).

BACKGROUND OF THE INVENTION

Where the term "mass" is used below it does not refer to the "physical mass" m, but to the "charge-related mass" m/z, where z is the number of the ion's uncompensated elementary charges. When simply "mass" or the "mass of the ions" is referred to here, it is always to be understood as the charge-related mass fraction m/z unless there is a note expressly stating otherwise. The terms "light ions" and "heavy ions" also relate to the charge-related mass fraction m/z.

The investigation of the structures, characteristics and activities of proteins, and of other biopolymers as well, is largely based on so-called "tandem mass spectrometry", which not only provides spectra of the mixtures of protein ions, but also allows individual types of protein ions to be exposed to certain reactions and their reaction products to be analyzed. A particularly interesting and frequently used type of such reactions is fragmentation, where "parent ions" are first selected for a fragmentation and then fragmented to form "daughter ions" so that the daughter ions produced can be measured in a mass spectrum. These daughter ion mass spectra contain information on the primary and secondary structures of the proteins that not only allows the genetically determined basic structure of their amino acids (the "sequence") to be identified, but also enables the recognition of type and localization of modifications that are important because they often cause a change of function ("post translational modifications", PTM).

Tandem mass spectrometry includes the following three individual steps: (1) selection of the analyte ions to be analyzed; (2) reactions causing a change; (3) mass analysis of the reaction products. These steps can be carried out sequentially in the same storage unit ("tandem-in-time") using storage mass spectrometers such as ion traps. However, it is also possible to spread these steps over three parts of the instrument ("tandem-in-space"): (1) selection of the analyte ions to be analyzed with a first mass analyzer, the "mass selector"; (2) reactions in a special reaction cell; and (3) mass analysis of the reaction products in a second mass analyzer, where mass analyzers with very high mass resolution can be used. From a historical point of view, tandem mass spectrometry in space, spread over different parts of the instrument, is older.

If the emphasis is on fast scanning rate, high mass resolution and high mass accuracy, the reaction products generated are preferably measured in time-of-flight mass spectrometers with injection of the ions orthogonal to the flight tube (OTOF-MS). Only if the measurement speed is of entirely secondary importance, modern embodiments of Kingdon ion traps or ion cyclotron resonance mass spectrometers can be used as mass analyzers, offering high mass resolution. However, these Fourier transform mass spectrometers have a slow scanning rates.

For the fragmentation of proteins or similar biopolymers there are essentially only two fundamentally different types of fragmentation available, "ergodic" and "non-ergodic" or "electron-induced" fragmentation, for each of which many different favorable embodiments exist. The ergodic fragmentations include collision-induced fragmentation of ions by collisions with the molecules of a damping or collision gas often referred to as collision-induced dissociation (CID), a method which has the shortcoming of a small mass range, and has difficulties with the fragmentation of heavy ions, however. A much more suitable method is ion-collision-induced fragmentation. An outstanding method of electron-induced fragmentation is "electron transfer dissociation" (ETD), a fragmenting reaction between ions with multiply positive and suitably negative charges.

The two types of fragmentation, ergodic and electron-induced, lead to two significantly different kinds of fragment ion spectra whose information contents are complementary and that deliver particularly detailed information on the structures of the analyte ions when both types of fragment ion spectra are measured. As the specialist is aware, the fragment ions of electron-induced fragmentations belong to the so-called c and z series and are therefore very different to the fragment ions of the b and y series, which are obtained by ergodic fragmentations. In particular, with electron transfer dissociation all side chains are preserved, which are lost with ergodic fragmentation, among them the important post translational modifications such as phosphorylations, sulfations and glycosylations. But for other analyses as well, for example de-novo sequencing, it is advantageous or even absolutely imperative to compare fragment ion spectra of good quality which have been obtained ergodically and by electron-induced methods.

The invention presented here refers in particular to electron transfer dissociation and the reaction cell required here, although it should also be possible to carry out ergodic fragmentations, such as collision-induced fragmentations, in the same reaction cell. Both types of fragment ion spectra should satisfy the highest quality requirements. A modem tandem mass spectrometer for bioanalysis must provide both types of fragmentation in methods with as few shortcomings as possible.

Electron transfer dissociation can be carried out in ion traps in which positive and also negative ions can be stored and can react with each other by introducing suitable negative ions to the stored positive analyte ions. Methods of this type have been described in U.S. Pat. No. 7,456,397 B2 and U.S. Published Application 2005/0199804 A1.

The fragmentation of protein ions by electron transfer is brought about by reactions between multiple positively charged protein ions and suitable negative reactant ions. Suitable negative reactant ions are usually specially selected radical anions, such as those of fluoranthene, fluorenone, anthracene or other polyaromatic compounds, but also of azulene or of non-aromatic compounds such as 1-3-5-7-cyclooctatetraene, for example. These radical anions can react very easily to form a stable neutral molecule with a complete electron configuration by releasing electrons. As described in the two patent documents cited above, they are generated, for example, in negative chemical ionization ion sources (NCI) by single electron capture or by electron transfer. The NCI ion sources are also called electron attachment ion sources.

The radical anions of suitable substances can also be produced directly or indirectly in electro-spray ion sources as are usually found in time-of-flight mass spectrometers with orthogonal ion injection. Indirect generation means that anions of certain substances are generated first and then converted into the radical anions which are useful as the reactant ions for ETD by careful collision-induced dissociation ("Electron-Transfer Reagent Anion Formation via Electrospray Ionization and Collision-Induced Dissociation", T.-Y. Huang et al., Anal. Chem. 2006, 78, 7387-7391).

So far, linear ion traps ("2D ion traps") have exclusively been used as ETD fragmentation cells in tandem mass spectrometers with high-resolution mass analyzers. Although ETD fragmentation can also be performed advantageously in three-dimensional ion traps ("3D ion traps"), the commercial embodiments of the 3D ion traps used have so far been limited to those mass spectrometers that use this 3D ion trap simultaneously and exclusively as a mass analyzer for measuring the fragmentation ion spectra. They are not designed to transfer the fragment ions into a different mass analyzer, and this is only possible with some effort and expense. In U.S. Published Patent Application 2009/0283675 A1 a 3D ion trap is proposed which is configured to transfer the fragment ions to a mass analyzer of higher mass resolution. The advantage of such a configuration is the high ETD fragmentation yield, for which there is also a hypothetical explanation in the document; a disadvantage is that it is more difficult to fill the 3D ion trap than a 2D ion trap.

For fragmentation by electron transfer, at least doubly, preferably triply, quadruply or even higher charged parent ions are selected; in some cases parent ions with a 10- or even 15-fold charge are fragmented. In linear ion traps, the freshly introduced parent ions are stored in the axis of the rod system in the form of a string-like cloud with small diameter after their kinetic energy has been damped by a collision gas. The linear ion traps are usually designed as multipole rod systems, i.e., as quadrupole, hexapole or octopole rod systems with two, three or four pairs of pole rods. A hexapole rod system is depicted in FIG. 1. The two RF voltage phases of opposite polarity are applied to the pole rods alternately around the circumference and generate a radially repulsive pseudopotential in the interior.

Quadrupole rod systems display a quadratic increase in the pseudopotential in the radial direction; the radial oscillations of the (undamped) ions are harmonic. Under the influence of a damping gas, with which these rod systems are usually filled, the ions collect in only a few milliseconds as a string-shaped cloud in the axis of the rod system. Quadrupole rod systems are not usually used as collision cells for fragmentations; more common are hexapole rod systems, which have a cubic pseudopotential increase and thus the pseudopotential well in the axis has a shallower bottom. The string-shaped cloud has a slightly larger diameter due to the smaller retroactive force.

A "pseudopotential" is not a real potential, but describes only the time-averaged action of the force of an inhomogeneous RF field on ions of arbitrary polarity. An RF voltage which is applied to the tip of an electrode, a wire or a pole rod generates such a repulsive inhomogeneous electric field. An RF dipole field also generates a pseudopotential that drives ions away from the dipole. Ions on the axis of the dipole are driven to the center of the dipole.

In this document all systems which confine ions radially with the aid of pseudopotentials, particularly the multipole rod systems, are called "ion guides", because they can transmit the ions in their interior. In this sense, the linear ion traps, and also quadrupole mass filters or the so-called ion funnels are ion guides, even if this is not their primary purpose.

Commercial instruments have so far used methods that trap positive and negative ions simultaneously in a reaction cell to induce unhindered reactions between the two species of ions in a controllable way. The principle for this storage is disclosed in U.S. Pat. No. 5,572,035 entitled "Method and Device for the Reflection of Charged Particles on Surfaces" to J. Franzen. This patent states all types of cylindrical or conical ion guides can be used as storage devices if the end openings are barred for the exit of ions by reflecting rf or dc potentials. It also states that with rf field reflection, ions of both polarities can be stored. In addition, it states with dc potentials, ion guides store ions of a single polarity only. This patent specification is concerned in a very general way with the reflection of ions of both polarities at pseudopotentials which are formed by inhomogeneous RF fields.

The confinement of ions in linear ion traps, which in the sense of this document belong to the ion guides, by an RF-generated pseudopotential barrier is therefore known. There are a variety of embodiments, however. The review article by Y. Xia and S. A. McLuckey provides an overview: "Evolution of Instrumentation for the Study of Gas-Phase Ion/Ion Chemistry via Mass Spectrometry", J Am Soc Mass Spectrom 2008, 19, 173-189.

Another embodiment is described in U.S. Pat. No. 7,026,613 B2 to J. Syka. In this specification, periodic voltages are applied to a first set of electrodes to generate a first oscillating electric potential, which confines the ions radially in an ion channel, and periodic voltages are applied to a second set of electrodes in order to generate a second oscillating electric potential that confines the ions axially in the ion channel. (Citation from the Summary: "Periodic voltages are applied to electrodes in the first set of electrodes to generate a first oscillating electric potential that radially confines the ions in the ion channel, and periodic voltages are applied to electrodes in the second set of electrodes to generate a second oscillating electric potential that axially confines the ions in the ion channel") The complex wording states nothing more than that a radially confining ion guide (the first set of electrodes) is closed for ions of both polarities with the aid of RF voltages at a second set of electrodes (which are necessarily arranged separately in the axial direction) by erecting a pseudopotential barrier in the axial direction. The essence of the disclosure in U.S. Pat. No. 7,026,613 is therefore solely the introduction of electrodes for the axially terminating RF voltage, which are not expressly mentioned in U.S. Pat. No. 5,572,035 by J. Franzen, but are of course inherently necessary.

It must be expressly pointed out here that the two RF voltages disclosed in U.S. Pat. No. 7,026,613 are applied to two different sets of electrodes. This leads to pseudopotential barriers with an unfavorable form, however. If the second RF voltage is applied to terminating electrodes at the end of the pole rods, for example to apertured diaphragms, a pseudopotential is generated with two maxima (see FIG. 5 top). An apertured diaphragm acts like the ring electrode of a three-dimensional ion trap and creates a storage space in the form of a pseudopotential well in the plane of the apertured diaphragm. The potential well of the storage space is terminated by a barrier at each end of the pseudopotential. If these double barriers are switched on by the RF voltage at the apertured diaphragm, filling is difficult because some of the ions always remain in the potential well of the storage space of the apertured diaphragm. Ion traps with this technology are therefore only ever filled with the pseudopotential barriers switched off, but this requires specially designed ion traps to solve the problems which then occur. In a commercially available instrument, where ETD is carried out in a linear ion trap of this type, the ion trap used is therefore segmented into three sections. The axis potentials of the sections can be set separately. This makes it possible to introduce positive and negative ions successively and store them in the interim in different sections of the linear ion trap, before the ions are mixed by equalizing the axis potentials and the reactions thus started.

U.S. Pat. No. 7,227,130 B2 entitled "Method for Providing Barrier Fields at the Entrance and Exit End of a Mass Spectrometer" (J. W. Hager and F. A. Londry, 2005) discloses that auxiliary RF voltages at the entrance and exit are applied to the terminating electrodes for a linear ion trap formed from long pole rods in order to trap ions of both polarities in the axial direction, the auxiliary RF voltages being obtained from the main RF voltage at the pole rods by voltage dividers. This is a special embodiment of the system disclosed in U.S. Pat. No. 7,026,613.

U.S. Pat. No. 7,288,761 B2 (B. A. Collings, 2005) describes for the first time the possibility of not applying the axially confining RF voltage to electrodes at the end of a multipole rod system, but making the axis potential of the rod system oscillate at RF with reference to its environment. This generates axial pseudopotential barriers at the ends of the multipole rod system. This method requires only one RF generator. The oscillating axis potential is generated either by an asymmetric arrangement of the pole rods about the axis or by two different amplitudes for the two phases of the RF voltage. Despite the advantageous use of only one RF generator there is the disadvantage here that the amplitude of the oscillating axis potential cannot easily be adjusted to the mass range of the ions to be trapped, because this requires that either the separations between the pole rods or the transformer for the generation of the two amplitudes must be changed for one of the two phases of the RF voltage.

PCT Application WO 2009 006726 (I. Chernushevich and A. Loboda, 2007) and German Patent Application DE 10 2008 055 899.0 (C. Stoermer, 2008) disclose operating mode for linear RF ion traps with a new type of electrical configuration for the pole rods. Multipole rod systems are used as RF ion traps. The configuration uses two RF voltages whose amplitudes can be set individually. The two phases of a first two-phase RF voltage are applied to the pole rods as usual, i.e., alternately around the circumference; this traps ions of both polarities radially. The second single-phase RF voltage is applied to all pole rods simultaneously; it produces practically no field in the interior of the rod system, but a single pseudopotential barrier at each end (see FIG. 5 bottom), which axially traps ions of both polarities. The ion trap can thus store positive and negative ions simultaneously without the need to apply an RF voltage to the terminating electrodes. The amplitude of the axially confining barrier of the pseudopotential can be adjusted independently of the radially confining pseudopotential. This arrangement represents the closest prior art for the invention presented here.

Decisive for assessing the quality of a reaction cell is the yield of product ions; for fragmentation by electron transfer (ETD) this means the yield of fragment ions. Here, all linear ion traps so far have had considerable disadvantages compared to the three-dimensional ion traps. A possible cause for this is listed in the German Patent Application DE 10 2008 023 693 A1 already mentioned above.

An objective of the invention is to provide a reaction cell which offers a high fragmentation yield for ETD fragmentation, but which is easier to fill with ions than a 3D ion trap. It shall also be suitable for collision-induced fragmentations of different types.

SUMMARY OF THE INVENTION

In a linear RF ion trap with at least three pairs of rods as the reaction cell, the two phases of a first RF voltage are applied to the pole rods alternately around the circumference, and serve to confine positive as well as negative ions in the radial direction. A second RF voltage is applied either single-phase to some of the pole rods, but not to all of them, or dual-phase to unequal numbers of pole rods. This second RF voltage causes the axis potential of the ion storage device to oscillate at RF frequency with respect to the potential of the surroundings and generates the desired axial pseudopotential barriers at the ends of the ion storage device, each with only one potential maximum, which act on ions of both polarities. In the interior, the second RF voltage results in a superposition field. A high fragmentation yield for ETD can be expected.

With a single-phase second RF voltage, it is preferable if only one, or only two pole rods on opposite sides, are not connected to the second, single-phase RF voltage in the case of both hexapole rod systems and octopole rod systems. This results in the distorted quadrupole field with the frequency of this second RF voltage in the interior. The frequency of this second RF voltage is preferably lower than that of the first RF voltage, resulting in a stronger pseudopotential than that of the first RF voltage for the same voltage amplitude. This means that heavy fragment ions particularly are trapped better in the ion storage device, and, even in the center, ions of opposite charge oscillate slightly in opposite directions.

In this operating mode the ion trap is at least as easy to fill as in the previously known operating modes. If apertured diaphragms are used as terminating electrodes, they are at DC potential and do not cause any interferences in the adjacent ion guides; moreover, the form of the axial potential barrier with only one single barrier maximum is particularly advantageous and the height of this barrier can easily be adjusted electrically. The ions of both polarities can be introduced into the linear ion trap from different sides, or sequentially from the same side.

This operating mode requires two more voltage feedthroughs than does the normal mode of a linear ion trap, which is used as the collision cell for ergodic ion fragmentations, for example. The rod system is supplied via four instead of the usual two supply leads, regardless of the number of rod pairs in the multipole rod system.

These and other objects, features and advantages of the present invention will become more apparent in light of the following detailed description of preferred embodiments thereof, as illustrated in the accompanying FIGS.

BRIEF DESCRIPTION OF THE DRAWING

In FIG. 8*a* only two diagonally opposite pole rods are free from the second RF voltage HF2, while in FIGS. 8*b* and 8*c* four pole rods are without RF voltage HF2 in each case. In the arrangements in FIGS. 8*b* and 8*c* the second RF voltage HF2 generates a superimposed quadrupole or octopole field in each case.

DETAILED DESCRIPTION OF THE INVENTION

A linear RF ion trap with at least three pairs of rods, for example a hexapole or octopole ion trap, applies a new type of electronic power configuration in order to achieve a higher yield of fragment ions for a fragmentation by electron transfer (ETD). Rod systems with only quite small inside diameters of around three to five millimeters are used for the reaction cell. This means that only moderately high RF voltages of only a few hundred volts are required, and these can be generated in relatively simple and small pot core transformers, so the price of the configuration is kept within reasonable limits.

Figure 1:
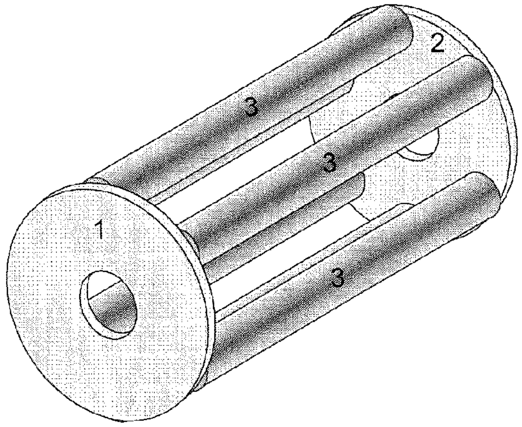
FIG. 1 shows as an example a hexapole ion trap with two apertured diaphragms 1, 2 as termination electrodes and six pole rods arranged on a cylindrical surface 3.
Figure 2:
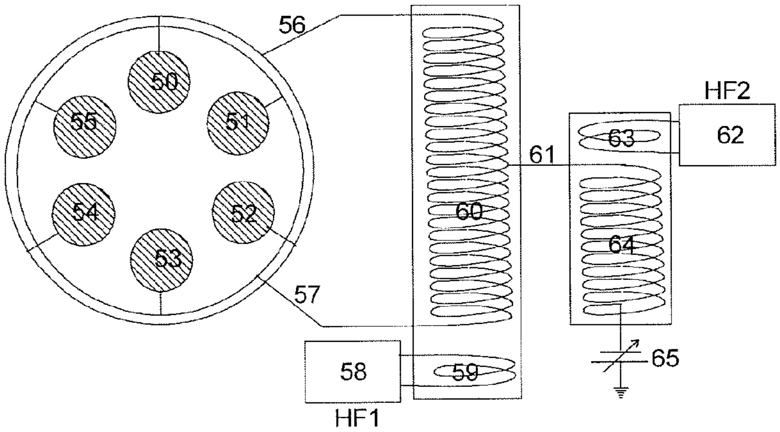
Figure 2 (Prior Art)
FIG. 2 depicts a wiring configuration of the pole rods 50 to 55 of a prior art hexapole ion trap, where only two supply leads 56 and 57 are required. The RF generator 58 with primary coil 59 and secondary coil 60 generates a two-phase RF voltage, whose two phases are supplied to the pole rods alternately around the circumference. The second RF generator 62 with primary coil 63 and secondary coil 64 generates a single-phase RF voltage which is supplied to all the pole rods 50-55 equally via the center tap 61 of the secondary coil 60 of the first RF generator 58. A DC voltage generator 65 provides the temporally averaged axis potential of the hexapole ion trap, measured with respect to ground potential.
Figure 3:
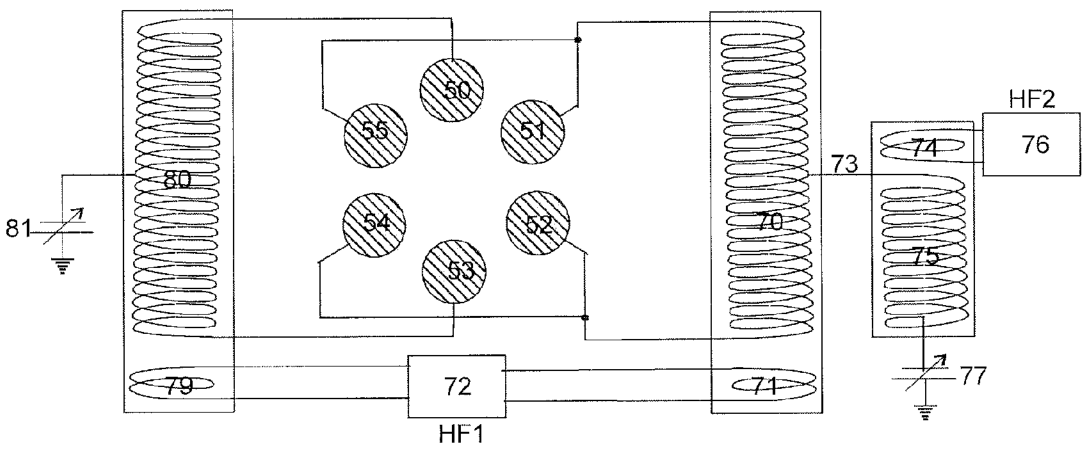
FIG. 3 shows the wiring configuration of the pole rods 50 to 55 of the hexapole ion trap according to an aspect of this invention, where four supply leads and three RF transformers are now required, but a higher yield of fragment ions is achieved. The RF generator 72 with first primary coil 71 and first secondary coil 70 generates a two-phase RF voltage, whose two phases are supplied alternately only to the four pole rods 51, 52, 54, 55, however. The two remaining pole rods 50, 53 are supplied from the same RF voltage generator 72 via a second primary coil 79 and a second secondary coil 80, a DC voltage generator 81 providing a contribution to the axis potential. The second RF generator 76 with primary coil 74 and secondary coil 75 generates a single-phase RF voltage, which is also supplied only to the pole rods 51, 52, 54, 55 via the center tap 73 of the first secondary coil 70 of the RF generator 72. A second DC voltage generator 77 provides a further contribution to the temporally averaged axis potential of the hexapole ion trap, measured with respect to ground potential. For a simpler embodiment the two DC voltage generators 77 and 81 can be combined.

FIG. 3 shows an embodiment for the wiring configuration of the pole rods 50 to 55 of a hexapole ion trap, where four supply leads and three RF transformers are now required, justified by the higher yield of fragment ions. A single-phase second RF voltage is used here, connected to four of the six rods. It may even still more effective for a high ETD yield to connect this single-phased RF voltage to five of the six rods, achieving an asymmetric field inside the ion guide.

The RF generator 72 supplies two pot core RF transformers with a first primary coil 71, a first secondary coil 70, a second primary coil 79 and a second secondary coil 75. The first secondary coil 70 generates a two-phase RF voltage, whose two phases are, however, supplied alternately to the four pole rods 51, 52, 54, 55. The two remaining pole rods 50, 53 are supplied with both phases of an RF voltage of the same frequency by the second secondary coil 80. This RF configuration generates the pseudopotential acting radially on the ions; this traps the ions in the radial direction. The amplitude of the RF voltage at the two pole rods 50 and 53 can even be selected to be different from the amplitude on the other pole rods; in a simple case, however, the amplitudes of the RF voltages on all the pole rods are the same. For the simplest embodiment it is even possible to use a pot core transformer with only one primary and two secondary windings, in which case the amplitudes of the RF voltage are preferably the same on all the pole rods.

The second RF generator 76 with its primary coil 74 and its secondary coil 75 generates a single-phase RF voltage, which is supplied only to the pole rods 51, 52, 54, 55 via the center tap 73 of the first secondary coil 70 of the RF generator 72. This single-phase RF voltage on only four of six pole rods generates a residual RF voltage in the axis of the rod system and thus the pseudopotential barrier at the end of the rod system. This pseudopotential barrier with only one maximum traps ions of both polarities in the axial direction.

It is also possible to use a two-phase second RF voltage for a hexapole ion trap (and also with higher-order multipole ion traps), in which case, for hexapole ion traps, four or five pole rods are supplied with the one phase, and the residual ones with the other phase. At least one third of the amplitude then still remains for the oscillation of the axis potential. For higher-order multipole ion traps it is important that the number of pole rods selected for the one phase is different to the number of pole rods for the other phase in order to keep a residual potential of the RF voltage in the axis.

In order to adjust the DC potential in the axis of the rod system, the DC voltage generators 77 and 81 in FIG. 3 provide DC voltages which each provide contributions to the axis potential of the hexapole ion trap, measured with respect to ground potential. In another embodiment the two DC voltage generators 77 and 81 can be combined in one unit. In yet another embodiment, the two DC voltage generators 77 and 81 can provide different DC voltages, which also has the effect of generating a distorted quadrupole DC field in the hexapole ion trap, and this distorted field can be used for a further optimization of the fragment ion yield.

The frequency of the second RF voltage can be selected more or less as desired, but should preferably be different from the frequency of the first RF voltage. The superimposition of the two RF voltages can be easily produced by feeding the second, single-phase RF voltage to the center tap 73 of the secondary coil 70 of the first transformer of the RF generator 72. Since the current flows through the two halves of the secondary coil in opposite directions, the magnetic fields balance each other out and no inductive resistance for the second RF voltage is produced. The two resonant circuits for the first and the second RF voltage, which each include the inductances of the secondary coils and the capacitances of the supply leads and pole rods, can be tuned separately for resonance and thus for a high quality, particularly if the two frequencies are chosen to be different and thus have little influence on the quality of each other's resonant circuit.

In a preferred embodiment, the frequency of this second RF voltage is selected to be lower than that of the first RF voltage. A frequency of around one megahertz for example is selected for the first RF voltage, while a frequency of around 500 kilohertz is preferably selected for the second. The pseudopotential increases reciprocally with the square of the frequency, but it acts differently on ions of different charge-related mass m/z, i.e., reciprocally to the mass m/z. Fragmentation by electron transfer generates a large number of daughter ions, whose charge-related mass m/z is higher than that of the parent ions, from the multiply positively charged parent ions. These apparently heavier daughter ions are held in the ion trap by the high pseudopotential, which is created by the distorted quadrupole field of the second RF voltage with a lower frequency, and are prevented from escaping.

Figure 8A:
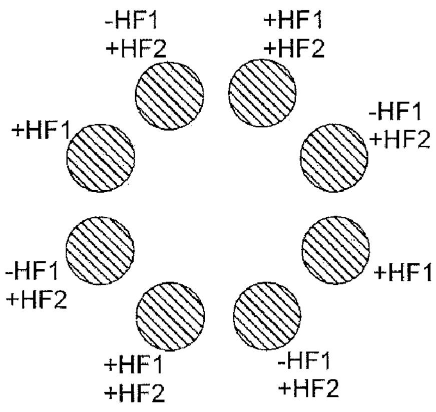
FIGS. 8*a*-8*c* show three embodiments for an octopole ion trap using a single-phase second RF voltage HF2.
Figure 8B:
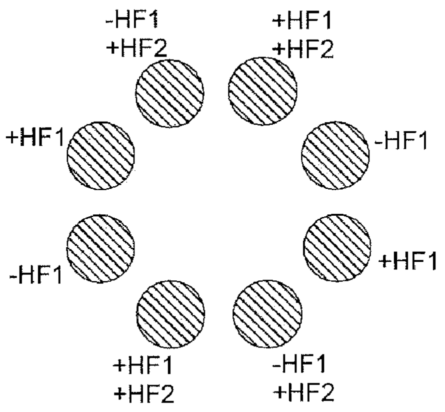
Figure 8C:
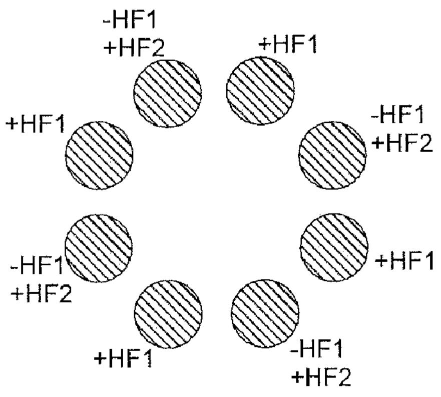

Instead of the hexapole ion trap it is also possible to use an octopole ion trap. The octopole ion trap can have several types of wiring configuration. FIGS. 8*a*-8*c* shows three embodiments for this octopole ion trap using a single-phase second RF voltage HF2. In FIG. 8*a* only two pole rods on opposite sides are free from the second RF voltage HF2, while in each of the FIGS. 8*b* and 8*c* four pole rods are without RF voltage HF2. It can be assumed that the embodiment of the wiring configuration in accordance with FIG. 8*a* also increases the yield of fragment ions at electron transfer. In the arrangements of FIGS. 8*b* and 8*c* the second RF voltage HF2 generates a superimposed quadrupole and octopole field respectively. Whether the wiring configurations in accordance with FIGS. 8*b* and 8*c* also provide increased yields of ETD fragment ions is not yet known, but these embodiments should not be excluded here.

These ion traps with a new type of wiring configuration can be operated without terminating apertured diaphragms and only with adjoining further rod systems, but it is advantageous to operate them with terminating apertured diaphragms at both ends because then the RF fields do not encroach into the adjoining rod systems quite so much.

Figure 5:
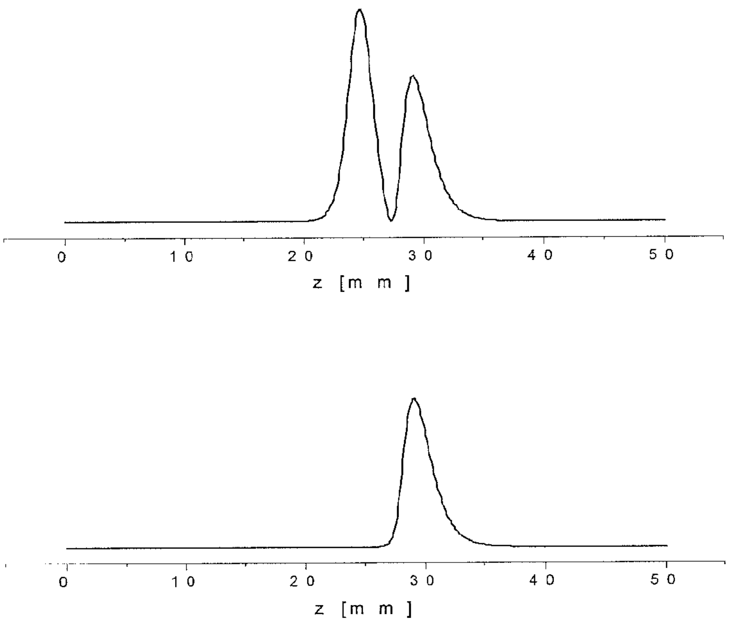
FIG. 5 presents two computer simulations of the pseudopotential barriers. In the top image the RF voltage is applied to the terminal ring diaphragm; there is a double barrier. In the bottom image, the RF voltage is applied jointly to several pole rods, as corresponds to this invention, and the terminal ring diaphragm is at DC potential, resulting in only a single barrier of the pseudopotential.
Figure 6:
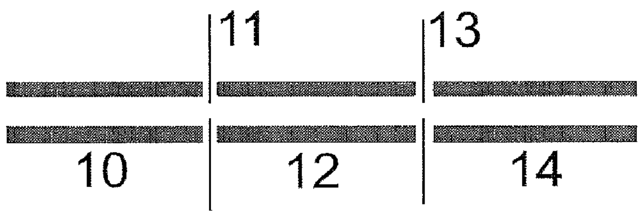
In FIG. 6 the pole rods 12 of a reaction ion trap are terminated by apertured diaphragms 11 and 13.

At each end of the linear reaction ion trap, only a single barrier of the pseudopotential is formed in the vicinity of the apertured diaphragm each time, not two barriers as is the case when an RF voltage is applied to the apertured diaphragm. FIG. 5 shows computer simulations of both cases: two maxima with RF voltage at the ring diaphragm (top), only one maximum at RF oscillating axis potential (bottom). The linear reaction ion trap can therefore still be filled relatively easily when the pseudopotential barrier is switched on by applying the second RF voltage; the ions, which regularly have only one charge-related mass m/z during the filling process, can then be pushed with accurately measured momentum through the apertured diaphragm and over the barrier of the pseudopotential which stands alone. In principle, it is easier to fill the ion trap in this mode of operation than in previously known operating modes, which created two potential barrier maxima at each end. The apertured diaphragms which are at DC potentials do not cause any perturbations in the adjoining ion guides; the ions can therefore receive their momentum as usual through a combination of axis potential of the ion guide and potential of the apertured diaphragm, and be thus injected.

With a symmetric design and arrangement of the apertured diaphragms, the two single barriers of the pseudopotential at the two ends of the rod system are the same height, but they can be given fundamentally different heights by geometric variations of the aperture diameters or the separations between apertured diaphragms and pole rods; the different heights cannot, however, be adjusted to different conditions when the ion trap is in operation.

A reaction ion trap with long pole rods, which therefore represents a preferred embodiment, is relatively easy to fill with ions because, on the one hand, the acceptance profile is quite advantageous and, on the other, the impetus of the ions (their momentum or their kinetic energy) can be decelerated quite well in the damping gas. The axially injected ions can be decelerated on the long path through the damping gas, at advantageous pressure, to such an extent that, after being reflected at the rear apertured diaphragm, they can no longer climb over the potential barrier at the front apertured diaphragm.

To fill the ion trap, the ions are injected axially over potential barriers at the apertured diaphragms. The potential barriers can be DC barriers, in which case ions of all masses but only one polarity can be injected and trapped simultaneously. But the potential barriers can also include pseudopotentials which are generated by the second RF voltage between pole rods and apertured diaphragms In this case it is advantageous to inject only ions of a relativley small mass range because the potential barrier appears to have a different height for ions of different masses, but for a successful capture the ions should not have more kinetic energy than is required for them to be just able to climb over the barrier. For the reactions between positive and negative ions, the ions are generally selected beforehand according to mass in such a way that the product ions remain easily interpretable. In general both the positive and negative ions will thus each belong to only a small mass range, which really only contains the respective isotope groups of the analyte ions or reactant ions being fragmented.

To store the ions after their thermalization by the damping gas, the height of the axial pseudopotential barrier can be low because the ions can escape only by virtue of their thermal speed. The only other factor is possibly a force component from the space charge in the ion trap. However, while the ions are being stored it may be necessary to adjust the barrier to a slightly higher level.

Different methods can be selected for the introduction of ions of both polarities.

In a preferred first method the first ionic species is injected in the usual way over DC barriers, the DC barriers being generated by DC voltages on the apertured diaphragms. The barrier of the pseudopotential is switched off. The ions are injected with an energy which is just sufficient to push them over the DC barrier into the ion trap. On their way to the apertured diaphragm at the exit, the ions lose part of their kinetic energy by collisions, which means they cannot climb over the potential barrier here, which is usually of the same height. They are reflected and return to the apertured diaphragm at the entrance, whose barrier they also can no longer climb over after further damping. If the damping of the ions' energy is very small because the pressure of the damping gas is too low, the capture can be improved in the usual way by selecting the barrier at the exit to be slightly higher than the one at the entrance, for example by having a higher DC voltage at the apertured diaphragm, or by continuously increasing the height of both barriers dynamically. The dynamic increase must be ended before the injection energies of the ions, which must also be increased, lead to collision-induced fragmentations, but can be repeated after the ions are damped.

In this first method, the DC barriers are replaced or combined with pseudopotential barriers after the injected ions of the first ionic species have been thermalized in order to introduce the second ionic species. The second ionic species, which has a different polarity to the first, is now pushed over the pseudopotential barrier. To this end they are provided with such an energy by the difference between the axis potential of the preceding ion guide and the DC potential of the apertured diaphragm that they can surmount the pseudopotential barrier. Since the ions are shaken at the frequency of the second RF voltage during this process, the height of the barrier here must also be selected so as to be as low as possible to avoid collision-induced fragmentations. Since the height of the barrier depends on the mass of the ions, an optimum height must be selected for each ion species. When descending from the barrier, the ions receive additional kinetic energy. When the ions have reached the interior of the ion trap, they are thermalized quickly, however, because the already stored ions of opposite polarity, with their large cross-section for direction-changing passes, contribute significantly to the fast thermalization.

In a second method both species of ion are introduced over the pseudopotential barrier. Here it is expedient to introduce the lighter ions first.

Various methods are known for determining the times for an optimum filling of the reaction ion trap, but they will not be discussed further here. The filling times bring about a filling with an optimum number of parent ions. This controls the number of charges inside the ion trap; other parameters are also important for an optimum response when acquiring spectra, but they will not be discussed here. For the filling with negative ions, on the other hand, it is in general only necessary to determine the best possible filling time once, since roughly the same number of negative ions are always needed for the best possible reaction with a fixed number of positive parent ions.

The linear reaction ion trap can be refined in many different ways. It is possible to use domed apertured diaphragms, for example, which enhance the axial barrier so that a lower voltage can be selected for the second RF. Domed apertured diaphragms can be produced with a similar form to that of end cap electrodes for three-dimensional ion traps.

Figure 7:
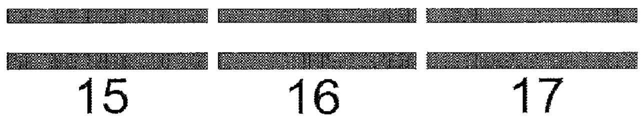
in FIG. 7, however, the adjacent ion guides 15 and 17 without apertured diaphragms serve as terminating electrodes for the reaction ion trap 16.

It is also possible for terminating electrodes in the form of apertured diaphragms to be absent from the ends of the pole rods; as is shown in FIG. 7, the pole rods of adjacent ion guides then serve as terminating electrodes, i.e., the pole rods of adjacent multipole rod systems, which feed the ions to the linear reaction ion trap or the product ions to the mass analyzer.

The pole rods of the linear reaction ion trap can also be provided with a non-conducting layer of high-resistance material. It is then possible to generate a DC voltage gradient along the axis of the ion trap. This requires voltage feeders at each end of the pole rods. If this voltage gradient is switched on after the reaction period, the positive product ions and the remaining negative reactant ions are driven apart and fed separately to the two ends of the ion trap; the reactions can therefore be quickly terminated at a favorable point in time and the product ions can be fed with an acceleration to the mass analyzer. Such a voltage gradient can also assist the filling of the ion trap. It can be used to fill the ion trap with both species of ions without switching on the axial pseudopotential barrier, because the two ionic species can be stored separately at the two ends of the ion trap if the terminating apertured diaphragms are supplied with appropriately confining DC potentials of opposite polarities.

If an AC voltage is supplied to the high-resistance layer instead of the DC voltage, it can be used to force ions to perform axial oscillations and thus to undergo soft collisions with the damping gas. Such an energy input by relatively low-energy collisions is sometimes necessary in electron transfer dissociation in order to complete dissociation reactions which have stalled after the transfer of an electron.

It is also possible to use segmented pole rods to segment the ion trap into sections, in which different axis potentials can be set in each case.

In addition to the two RF voltages, an electronics specialist can apply further excitation voltages to the pole rods in order to thereby radially excite the ions. Such radial excitations can be used for additional collision processes, as are required for stalled dissociation reactions, for example.

Such radial excitation voltages can also be used to specifically eject ions of selected masses from the ion trap by excitation in resonance. This makes it possible, for example, to select the parent ions to be fragmented and to isolate them before the reactant ions are introduced.

Figure 4:
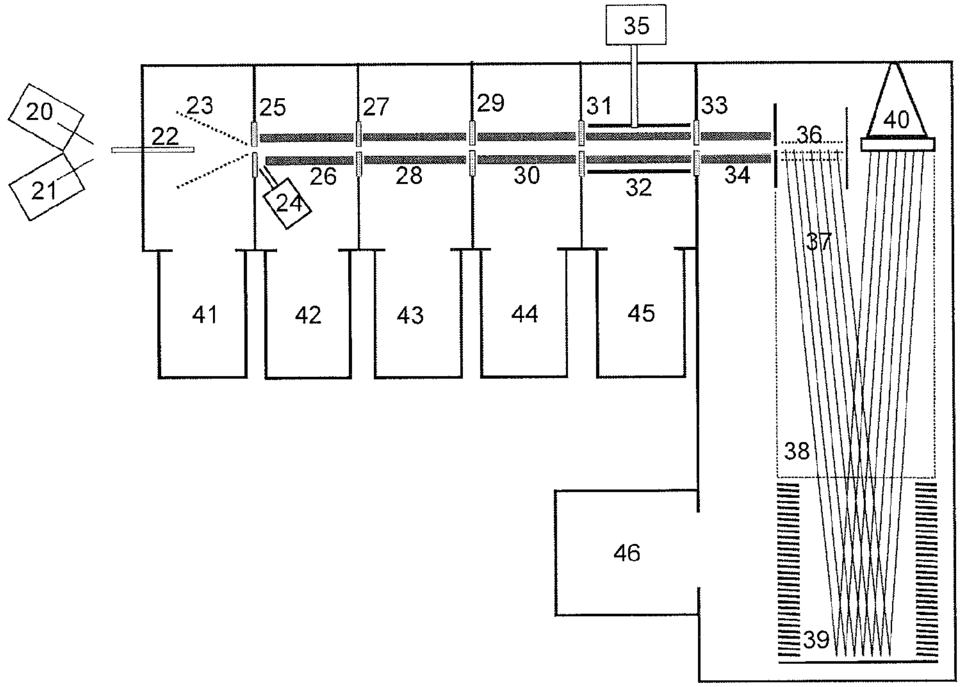
FIG. 4 schematically depicts a tandem mass spectrometer. A high-resolution time-of-flight mass analyzer with orthogonal ion injection is used as the mass analyzer. This is located at the end of a chain of ion guides 23, 26, 28, 30, 32, 34 serving different purposes: the rod system 28, for example, is used as a mass selector and 32 as a reaction cell. The reaction ion trap 32 has a supply line 35 for a damping gas. An electrospray ion source with two spray devices 20 and 21 can generate positive and negative ions from suitable solutions without the solution flow having to be switched. The inlet capillary 22 draws the ions, together with curtain gas, into the vacuum system, where they are collected by the ion funnel 23 and introduced through the apertured diaphragm in the wall 25 to the ion guide 26. In the quadrupole filter 28, the ions can be selected according to their mass and introduced through the next ion guide 30 into the reaction ion trap 32. Ions from one of the electrospray ion sources can serve as reactant ions, as can ions from an electron attachment ion source 24, which can be fed into the ion guide 26. The reaction products are introduced in the familiar way through the ion guide 34 to the pulser 36 of the time-of-flight mass spectrometer. As every specialist knows, the pulser 36 pulses out a section of the ion beam perpendicular to the direction of flight, and forms it into an ion beam 37, which is sent by the energy-focusing reflector 39 with high mass-resolution to the detector 40. The ion guides serve, among other things, to guide the ions through the different chambers 25, 27, 29, 31 and 33 of a differential pumping system with the pumps 41 to 46. The differential pumping system creates the pressures necessary in the different chambers.

In a preferred embodiment, the negative reactant ions (radical anions) for the electron transfer dissociation are produced in special electron attachment ion sources 24 which, as is shown in FIG. 4, are installed in the vacuum system of the mass spectrometer. The reactant ions can then be fed into an ion guide 26 from the chain of ion guides 23, 26, 28, 30 which also bring the positive analyte ions to the reaction cell. The use of an electron attachment ion source 24 is particularly convenient because it is always present and can always be kept operational. It can be set up optimally for the production of radical anions of a preferred substance.

It has already been shown several times, however, that radical anions of suitable substances can be produced in conventional electrospray ion sources. These must be operated with spray voltages for the production of negative ions. Electrospray ion sources with several spray devices, such as 20 and 22 in FIG. 4, already exist so that there is no need to change over the liquid feed.

It was shown in an above-cited publication that it is possible to produce non-radical anions of certain substances in an electrospray ion source, the anions only being fragmented afterwards in a collision cell to form radical daughter ions, usually by splitting off carbon dioxide from an acid group. This method can also be carried out in a mass spectrometer as per FIG. 4.

FIG. 4 shows a time-of-flight mass spectrometer with orthogonal ion injection, in which the chain of ion guides 23, 26, 28, 30, 32, 34 includes a reaction ion trap 32 with supply line 35 for a special damping gas. The electrospray ion source is provided with two spray units 20 and 21 and can generate positive and negative ions from suitable solutions without the solution flow needing to be switched.

The ions are drawn into the vacuum system together with the curtain gas via the inlet capillary 22. They are collected by the ion funnel 23 and fed through the apertured diaphragm in the wall 25 to the ion guide 26. The ions can be selected according to their mass in the quadrupole filter 28 and be fed through the next ion guide 30 to the reaction ion trap 32.

Ions from one of the two electrospray ion sources 20 or 21 can serve as reactant ions, as can ions from the electron attachment ion source 24, which can be fed into the ion guide 26.

After the reaction period, the reaction products can be fed via the ion guide 34 to the pulser 36 of the time-of-flight mass spectrometer. The pulser 36 pulses out a section of the ion beam perpendicular to the direction of flight, and forms it into an ion beam 37 which is sent to the detector 40 by the energy focusing reflector 39, with high mass-resolution.

The ion guides serve to guide the ions through the different chambers 25, 27, 29, 31 and 33 of a differential pumping system with the pumps 41 to 46. The differential pumping system creates the pressures necessary in the different chambers in each case.

A method for acquiring a fragment ion spectrum usually requires that a first mass spectrum of the unfragmented analyte ions is acquired first, and for an enzymatically digested protein, for example, provides an overview of the digest peptides. If it is now intended to analyze a peptide for its sequence of amino acids, then the reaction ion trap is filled with triply, quadruply or quintuply charged ions of this peptide, the ionic species being selected and then isolated in the mass filter 28. The number of charges can be recognized from the spacing of the isotope lines: for triply charged ions this is exactly ⅓ of an atomic mass unit, for example.

The multiply charged parent ions for the fragmentation are decelerated back into the center of the reaction ion trap 32 by a short delay of a few milliseconds by the collision or damping gas, which is introduced via the line 35. In reaction ion traps it is usually nitrogen, but sometimes helium, at a pressure of around $10^{-2}$ pascal which is used as the collision gas; in special cases the selected pressure can also be up to two orders of magnitude higher. The multiply charged parent ions form a small string-shaped cloud there, whose diameter depends on the number of stored ions, and also on the value of the RF voltage for the radial confinement. It can certainly be around one to two millimeters at low RF voltage and when a large number of between 20,000 and 50,000 parent ions have been introduced.

After this, the negatively charged radical anions are added. These ions are generated here in a separate ion source 24 for negative chemical ionization and guided to an ion selector, where they are threaded into the ion guide 26. In the embodiment shown here, the ion selector includes of a shortening of two rods of the rod-shaped ion guide 26. It is particularly favorable for this type of ion merger if the ion guide takes the form of a hexapole or octopole rod system. This ion merger can allow the analyte ions of the electrospray ion source 20, 21 to pass unhindered if suitable voltages are applied to the aperture integrated in the wall 25; with other voltages, the negative radical anions from the ion source 24 are reflected into the ion guide 26. Via this ion guide 26 and further ion guides 28 and 30, they reach the reaction ion trap 32 and are stored there as described above. They react immediately (e.g., within a few tens of milliseconds) with the positive parent ions, usually causing spontaneously fragmenting.

The reaction ion trap for the storage of ions of both polarities can be used not only for fragmentation by electron transfer dissociation, but also for ergodic fragmentations. Injecting ions with sufficient kinetic energy can bring about decomposition by a sufficiently large number of collisions with the collision gas molecules, the internal energy of the ions being increased slightly with every collision. This collision-induced fragmentation also has disadvantages, however: in particular the mass range for the fragment ions is very limited, and heavy ions can hardly be fragmented because for them the cooling by the collision gas predominates.

Other types of ergodic fragmentation are possible, however. By installing a further appropriate ion source for the production of negatively charged iodine ions in the instrument according to FIG. 4, for example, it is possible to bring about an ergodic fragmentation of positively charged protein parent ions. Introducing these iodine ions into the reaction ion trap impacts the parent ions, which are stored in a stationary state, so that they take up large amounts of energy with every collision and thus undergo an ergodic fragmentation relatively quickly. A fragment ion spectrum with high quality and a large mass range can thus be acquired. The fragmentation of protein ions with physical mass of m above around m=3,000 daltons is also possible. In this tandem mass spectrometer both types of fragmentation are thus available in a high quality in each case; this is ideal for the analysis of post translational modifications and many other structural details.

The phases of the second RF voltage may be connected to all the pole rods around the circumference, but to have different amplitudes. The scope of protection shall thus include variations of connections of the second RF voltage to the pole rods where the second RF voltage in the axis of the ion trap is not completely cancelled out, but leaves an RF potential. Any residual RF potential in the axis with respect to the environment, in particular with respect to the terminating electrodes at the ends of the ion trap, generates the desired barrier of the pseudopotential. The yield of fragment ions can then be optimized by the variations which this allows.

Although the present invention has been illustrated and described with respect to several preferred embodiments thereof, various changes, omissions and additions to the form and detail thereof, may be made therein, without departing from the spirit and scope of the invention.

What is claimed is:

1. A linear RF ion trap with a plurality of pole rods which are supplied alternately around the circumference with both phases of a first RF voltage, comprising:

a single phase of a second RF voltage is supplied to some but not all of the plurality of pole rods, or one phase of a second RF voltage is applied to a first group of the plurality of pole rods, and the other phase of the second RF voltage is supplied to a second group of the plurality of pole rods, the two groups of pole rods not being equal in number.

2. A linear RF ion trap according to claim 1, wherein the distribution of the second RF voltage to the pole rods is spatially symmetric to the axis.

3. A linear RF ion trap according to claim 1, wherein the distribution of the second RF voltage to the pole rods is spatially asymmetric to the axis.

4. A linear RF ion trap according to claim 1, wherein the second RF voltage can be switched off.

5. A linear RF ion trap according to claim 1, wherein the ion trap comprises terminating electrodes at both ends.

6. A linear RF ion trap according to claim 5, wherein the terminating electrodes comprises apertured diaphragms.

7. A linear RF ion trap according to claim 6, wherein the apertured diaphragms are domed.

8. A linear RF ion trap according to claim 5, wherein the terminating electrodes have the form of adjacent ion guides.

9. A linear RF ion trap according to claim 1, wherein the pole rods comprise a non-conducting high-resistivity layer and a power supply generates a potential gradient along the pole rods.

10. A linear RF ion trap according to claim 1, wherein the ion trap is divided into segments by a segmentation of the pole rods.

11. A linear RF ion trap according to claim 10, wherein a supply device for the pole rods with voltages in the segments of the ion trap can supply separately adjustable axis potentials.

12. A linear RF ion trap with a plurality of pole rods which are supplied alternately around the circumference with both phases of a first RF voltage, comprising:

a second RF voltage is supplied in an asymmetrical way to some or all of the pole rods in such a way that a residual RF potential remains in the axis of the linear ion trap.

* * * * *

UNITED STATES PATENT AND TRADEMARK OFFICE

CERTIFICATE OF CORRECTION

PATENT NO. : 8,314,384 B2
APPLICATION NO. : 13/112593
DATED : November 20, 2012
INVENTOR(S) : Carsten Stoermer, Karsten Michelmann and Michael Schubert It is certified that error appears in the above-identified patent and that said Letters Patent is hereby corrected as shown below:

Column 2
Line 42, please delete “modem” and insert --modern--

Signed and Sealed this
Twelfth Day of February, 2013

Teresa Stanek Rea
*Acting Director of the United States Patent and Trademark Office*